S. S. FULLER.
TRACTION BAND.
APPLICATION FILED NOV. 15, 1920.
1,431,517.
Patented Oct. 10, 1922.
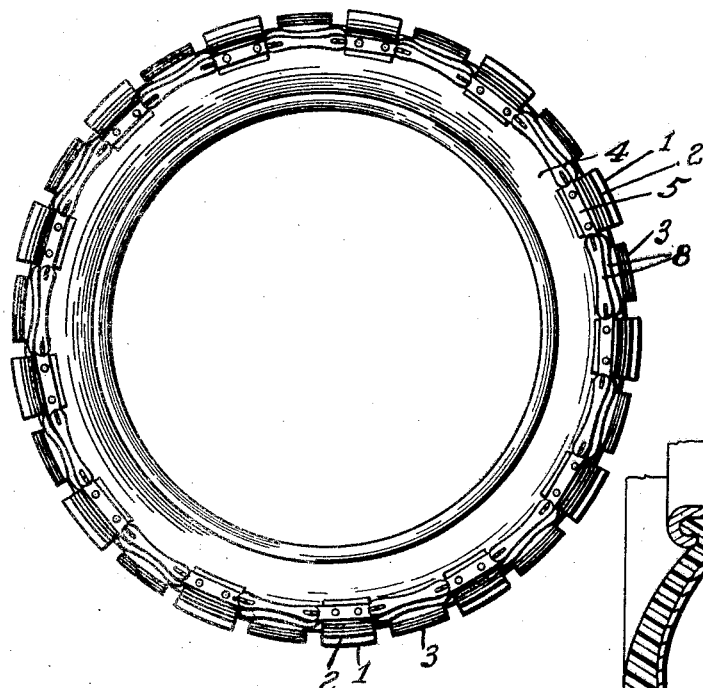
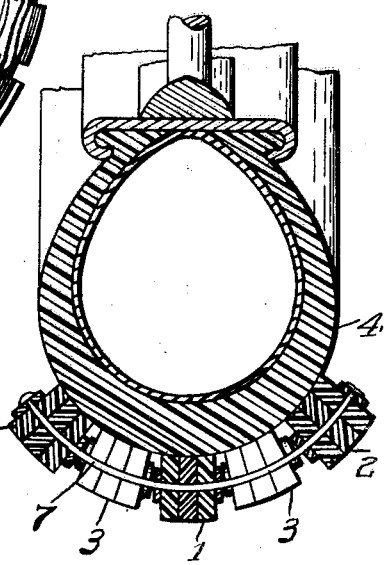
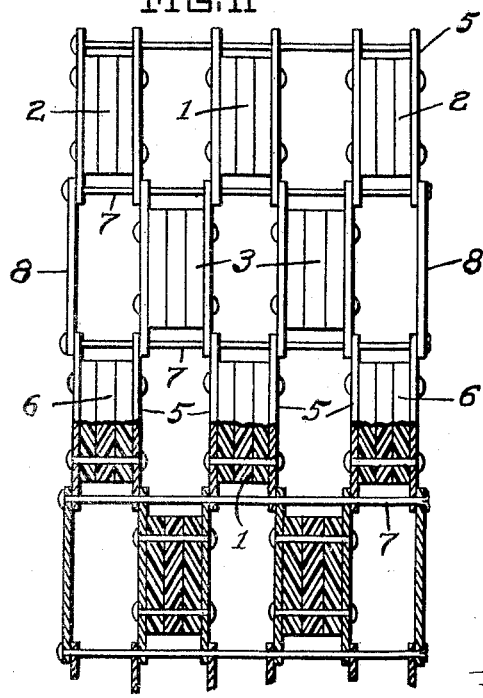
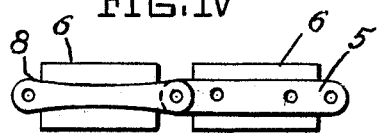
Inventor
Silas Stillman Fuller
By *Ellis Spear Jr.*
Attorney Patented Oct. 10, 1922.

1,431,517

UNITED STATES PATENT OFFICE.

SILAS STILLMAN FULLER, OF ROXBURY, MASSACHUSETTS.

TRACTION BAND.

Application filed November 15, 1920. Serial No. 424,075.

*To all whom it may concern:*

Be it known that SILAS STILLMAN FULLER, a citizen of the United States, residing at Roxbury, county of Suffolk, Commonwealth of Massachusetts, has invented certain new and useful Improvements in Traction Bands, of which the following is a specification.

This invention relates to traction surfaces and particularly to a non-skid traction overshoe attachment which may be readily applied when desired over the usual tread surface of an automobile tire or the like and quickly removed after the occasion for its use has passed.

The principles of my invention may also be applied to the field of power transmission and in such application may take the form of an endless belt adapted to run over a pulley or the like. For the purposes of this application, however, I shall show and discuss my invention as a traction overshoe for automobile tires, although it will be understood that the treatment is purely illustrative and in no way limiting.

Such devices as have been proposed heretofore have been open to objection as being too expensive, too heavy, too complicated, or too noisy in use. In such a device the desiderata are that the traction attachment shall be light and simple in structure so as not to materially add to the weight of the car; capable of easy and quick attachment and removal; closely fit the tire so as not to slip and generate friction which will burn the tread and tear up the road-way; and silent in use.

To the end therefore of providing a traction attachment embodying the foregoing features, I have devised my present invention.

The construction and manner of applying and removing my device is described and illustrated in the accompanying specification and drawings, throughout which like reference characters are correspondingly applied.

In the drawings:

Fig. I is a general view of a tire equipped with my invention.

Fig. II is a cross section thereof.

Fig. III is a partial development of the tread, and

Fig. IV is a detail more fully described hereinafter.

According to my invention, my traction attachment consists of a series of peripherally disposed rows of interconnected tread units. The center unit row is indicated at 1, the side rows at 2, and the rows between the center and side rows at 3.

The units of each row are so arranged relatively to each other as to provide a reticulated band adapted to encircle and be held closely against the tread of the tire 4 when the inner tube thereof is inflated. Each link unit consists of a pair of half round metal side members 5 between which is secured a series of tread elements 6. The tread elements may be of cork, rubber or fibre, and the units themselves are removable and replaceable. If desired the side rows 2 of tread units may be of rubber or rubber and fabric composition and the center row 1 may be of cork. The ends of the side members 5 of the tread units are adapted to fasten either to the side members of adjacent units or to one of a plurality of fasteners 7 which are disposed transversely of the tire. The fasteners 7 may be of simple cotter pins which extend through the side members of the tread units and are bent as shown in Fig. II to follow the curvature of the tire. Such pins are secured in position by spreading their split ends away from each other as with the ordinary cotter pin.

At each side of the band I provide a row of adjusting links 8 for shortening or lengthening the band to fit the tire. These links are simple metal strips which fasten to the side members 5 of the tread units and to the cotter pins 7 wherever such pins occur, and cause the band to hug the tire under the conditions of operation. They also maintain the band centrally on the tire, or in the case of power transmission, maintain the belt centrally on the pulley. The links 8 are slightly shorter than the side links 5 of the side rows of tread units 2 and said links in turn are preferably slightly shorter than the side links 5 of the intermediate tread rows 3 in order to conform to the tire.

My traction attachment may be readily applied by removing any one of the cotter pins to permit the band to be laid around the tire or pulley, whereupon the cotter pin thus removed is replaced.

When applied to an automobile tire, my device presents a tread surface to the roadway of substantially twice the width of the tread of the tire upon which it is used, thus not only increasing the traction obtained but effectually preventing side skidding.

Various modifications in the form and construction of my device may obviously be resorted to without departing from the spirit of my invention, if within the limits of the appended claims.

What I therefore claim and desire to secure by Letters Patent is:

1. In a traction band, a plurality of connected rows of spaced traction units, each unit consisting of a pair of spaced rigid side links, and an interposed laminated filling between said links comprising a central insert of cork and side inserts of rubber compressed between and permanently fastened to said links, the ends of said links extending beyond the ends of said inserts and having transversely alined perforations and a plurality of fastenings disposed transversely of the band and set through the perforations of said links.

2. In a traction band, a plurality of connected rows of spaced traction units, each unit consisting of a pair of spaced rigid side links, and an interposed laminated filling between said links comprising a central insert of cork and side inserts of rubber compressed between and permanently fastened to said links, the ends of said links extending beyond the ends of said inserts and having transversely alined perforations and a plurality of fastenings disposed transversely of the band and set through the perforations of said links, and a series of longitudinally spaced adjusting links mounted upon alternate pairs of said transverse fastenings exteriorly of the adjacent side links of certain of the traction units, at each longitudinal edge of the band.

3. A traction band comprising a central row of longitudinal spaced traction units and a row of longitudinally spaced traction units disposed on either side of said central row and spaced therefrom transversely of the band, each unit consisting of a pair of spaced rigid side links and a laminated filling fastened to said side links, the ends of said side links extending beyond the ends of said filling, a plurality of transversely disposed fastenings detachably engaged with the extensions of said side links, and a series of longitudinally spaced adjusting links mounted upon alternate pairs of said transverse fastenings exteriorly of the adjacent side links of certain of the units in said side rows of units at each longitudinal edge of the band.

In testimony whereof I affix my signature in presence of two witnesses.

SILAS STILLMAN FULLER.

Witnesses:
VICTORIA LOWDEN,
MARION F. WEISS.